(12) United States Patent
Shin

(10) Patent No.: US 11,935,061 B2
(45) Date of Patent: Mar. 19, 2024

(54) DEVICE AND METHOD FOR DETECTING A FRAUDULENT FINANCIAL TRANSACTION

(71) Applicants: HYUNDAI MOTOR COMPANY, Seoul (KR); KIA CORPORATION, Seoul (KR)

(72) Inventor: Yong Woo Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 154 days.

(21) Appl. No.: 17/410,833

(22) Filed: Aug. 24, 2021

(65) Prior Publication Data
US 2022/0172212 A1     Jun. 2, 2022

(30) Foreign Application Priority Data
Nov. 27, 2020 (KR) ........................ 10-2020-0163221

(51) Int. Cl.
| | |
|---|---|
| *G06Q 20/40* | (2012.01) |
| *B60L 53/66* | (2019.01) |
| *B60L 58/12* | (2019.01) |
| *B60W 40/10* | (2012.01) |
| *G06Q 30/018* | (2023.01) |
| *G06Q 30/0283* | (2023.01) |
| *G06Q 50/06* | (2012.01) |

(Continued)

(52) U.S. Cl.
CPC ........ *G06Q 20/4016* (2013.01); *B60L 53/665* (2019.02); *B60L 58/12* (2019.02); *B60W 40/10* (2013.01); *G06Q 20/40145* (2013.01); *G06Q 20/4015* (2020.05); *G06Q 30/0185* (2013.01); *G06Q 30/0284* (2013.01); *G06Q 50/06* (2013.01); *G07B 15/02* (2013.01); *G07C 5/008* (2013.01); *G06Q 2240/00* (2013.01)

(58) Field of Classification Search
CPC ........... G06Q 20/4016; G06Q 20/4015; G06Q 20/40145; B60L 58/12; B60L 53/665
USPC .................... 705/13, 1.1, 7.11, 14.26, 14.47
See application file for complete search history.

(56) References Cited

FOREIGN PATENT DOCUMENTS

| | | | | |
|---|---|---|---|---|
| AU | 2011208621 A1 | * | 7/2012 | ........... G05D 1/0005 |
| CA | 3052440 A1 | * | 2/2020 | |

(Continued)

OTHER PUBLICATIONS

Soviany, Cristina. "The Benefits of Using Artificial Intelligence in Payment Fraud Detection: A Case Study." Journal of payments strategy & systems 12.2 (2018): 102-110. Print. (Year: 2018).*

*Primary Examiner* — Akiba K Robinson
(74) *Attorney, Agent, or Firm* — Lempia Summerfield Katz LLC

(57) ABSTRACT

A device and a method for detecting a fraudulent financial transaction in an in-vehicle payment may include a processor that detects the fraudulent financial transaction in the in-vehicle payment based on at least one of a vehicle location, the number of vehicle occupants, a state of a communication network, a vehicle speed, whether a fingerprint authentication module is mounted, a state of a battery, a user account, and/or information on the in-vehicle payment when the in-vehicle payment is requested from a vehicle providing an in-vehicle payment function. An effect of strengthening security of the in-vehicle payment by detecting the fraudulent financial transaction in the in-vehicle payment may be provided.

10 Claims, 4 Drawing Sheets

(51) Int. Cl.
*G07B 15/02* (2011.01)
*G07C 5/00* (2006.01)

(56) References Cited

FOREIGN PATENT DOCUMENTS

| | | | | | |
|---|---|---|---|---|---|
| CN | 109670811 | A | * | 4/2019 | ............. G06F 21/32 |
| CN | 111353782 | A | * | 6/2020 | ............. G06Q 20/30 |
| JP | 4085534 | B2 | * | 5/2008 | |
| SG | 10201510469 | A | * | 7/2017 | ............. H04W 4/02 |

* cited by examiner

| | Fraud detection rule | |
|---|---|---|
| BASED ON VEHICLE LOCATION INFORMATION | CURRENT PAYMENT OCCURRENCE TIME − PREVIOUS PAYMENT OCCURRENCE TIME < SHORTEST TIME REQUIRED WHEN TRAVELING BETWEEN TWO POINTS AT CORRESPONDING TIMESLOT → DETERMINE AS FRAUD: CASE IN WHICH INTERVAL BETWEEN PAYMENT OCCURRENCE TIMES IS EXCESSIVELY SMALL | |
| | WHEN CURRENT GPS VALUE OF VEHICLE AND GPS VALUE OF AFFILIATE STORE WHERE PAYMENT HAS BEEN REQUEST ARE DIFFERENT EVEN AFTER CORRECTING CERTAIN LOCATION ERROR → DETERMINE AS FRAUD | |
| BASED ON VEHICLE STATE INFORMATION | WHEN PAYMENT IS REQUESTED IN STATE IN WHICH NUMBER OF OCCUPANTS IS '0' IDENTIFIED THROUGH ODS (OCCUPANT DETECTION SYSTEM) OF VEHICLE → DETERMINE AS FRAUD | |
| | WHEN PAYMENT IS REQUESTED IN VEHICLE CAN SLEEP STATE → DETERMINE AS FRAUD | |
| | WHEN CURRENT VEHICLE SPEED IS EQUAL TO OR HIGHER THAN 10 KM/H AND PAYMENT IS REQUESTED → DETERMINE AS FRAUD | |
| | WHEN FIDO AUTHENTICATION PAYMENT IS REQUESTED FROM VEHICLE IN WHICH FINGERPRINT AUTHENTICATION MODULE IS NOT MOUNTED → DETERMINE AS FRAUD | |
| | WHEN BATTERY IS CURRENTLY BEING CHARGED AND PAYMENT IS REQUESTED → DETERMINE AS FRAUD | |
| BASED ON USER ACCOUNT INFORMATION | WHEN PAYMENT IS REQUESTED WITH PAYMENT MEANS OTHER THAN PAYMENT CARD REGISTERED IN USER INFORMATION OF CURRENT VEHICLE → DETERMINE AS FRAUD | |
| BASED ON PAYMENT INFORMATION | WHEN PRICE OF PRODUCT/SERVICE OF AFFILIATE STORE AND AMOUNT OF MONEY REQUESTED FOR PAYMENT ARE DIFFERENT | [GAS STATION] PRICE FOR EACH OIL TYPE OF CORRESPONDING GAS STATION AT TIME OF PAYMENT X (MAXIMUM FUEL STORAGE CAPACITY OF PAYMENT VEHICLE − CURRENT FUEL REMAINING AMOUNT) < AMOUNT OF MONEY OF PAYMENT → DETERMINE AS FRAUD |
| | | [CHARGING STATION] CHARGING PRICE OF CORRESPONDING CHARGING STATION AT TIME OF PAYMENT X (MAXIMUM CHARGEABLE CAPACITY OF PAYMENT VEHICLE − CURRENT BATTERY REMAINING AMOUNT) < AMOUNT OF MONEY OF PAYMENT → DETERMINE AS FRAUD |
| | | [PARKING LOT] PARKING FEE FOR EACH UNIT TIME OF CORRESPONDING PARKING LOT AT TIME OF PAYMENT X (CURRENT PAYMENT REQUIRED TIME − TIME AT WHICH PAYMENT VEHICLE IS DETERMINED TO ARRIVE AT PARKING LOT DESTINATION) < AMOUNT OF MONEY OF PAYMENT → DETERMINE AS FRAUD |
| | WHEN TYPE OF PRODUCT/SERVICE OF AFFILIATE STORE AND ORDER INFORMATION REQUESTED FOR PAYMENT ARE DIFFERENT | [GAS STATION, CHARGING STATION] WHEN PAYMENTS ARE DIFFERENTLY REQUESTED FOR FUEL TYPE OF VEHICLE (GASOLINE, DIESEL, LPG, HYDROGEN, ELECTRIC VEHICLE, PHEV) → DETERMINE AS FRAUD |

Fig.3

DEVICE AND METHOD FOR DETECTING A FRAUDULENT FINANCIAL TRANSACTION

CROSS-REFERENCE TO RELATED APPLICATION

This application claims the benefit of priority to Korean Patent Application No. 10-2020-0163221, filed in the Korean Intellectual Property Office on Nov. 27, 2020, the entire contents of which are incorporated herein by reference.

TECHNICAL FIELD

The present disclosure relates to a device and a method for detecting a fraudulent financial transaction, and more particularly, to a device and a method for detecting a fraudulent financial transaction in in-vehicle payment.

BACKGROUND

Recently, an in-vehicle simple payment service has been provided. The in-vehicle simple payment service is a service in which payment is automatically performed through communication between a vehicle and a payment system without a driver alighting the vehicle. A user may conveniently use the service and purchase a product through the in-vehicle simple payment service, but security reinforcement is required accordingly.

A vehicle equipped with security solutions, such as personal identification number (PIN) code input, fast identity online (FIDO) fingerprint authentication payment, and the like performed during an in-vehicle simple payment, has been developed, so that security is being strengthened. Such a security solution is able to guarantee stability of a payment process itself. However, such a security solution is not able to detect a fraudulent financial transaction based on a usage scenario.

In particular, when a detection rule in consideration of an environment of the in-vehicle payment is defined and applied, the security is able to be strengthened, so that a need therefor arises.

SUMMARY

The present disclosure has been made to solve the above-mentioned problems occurring in the prior art while advantages achieved by the prior art are maintained intact.

An aspect of the present disclosure provides a device and a method for detecting a fraudulent financial transaction in an in-vehicle payment.

Another aspect of the present disclosure provides a device and a method for detecting a fraudulent financial transaction in an in-vehicle payment that may reduce a cost in a process of detecting the fraudulent financial transaction by simply detecting the fraudulent financial transaction based on a usage scenario.

Another aspect of the present disclosure provides a device and a method for detecting a fraudulent financial transaction in an in-vehicle payment that may prevent a financial crime against the in-vehicle payment by easily detecting the fraudulent financial transaction in the in-vehicle payment.

Another aspect of the present disclosure provides a device and a method for detecting a fraudulent financial transaction in an in-vehicle payment that may strengthen security by detecting the fraudulent financial transaction in the in-vehicle payment to stop a payment function of a corresponding vehicle. The device and the method may also allow the payment function of the vehicle to be reactivated through an application of a vehicle owner's smart phone.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a device for detecting a fraudulent financial transaction includes a processor that detects the fraudulent financial transaction in an in-vehicle payment. The processor detects the fraudulent financial transaction based on at least one of a vehicle location, the number of vehicle occupants, a state of a communication network, a vehicle speed, whether a fingerprint authentication module is mounted, a state of a battery, a user account, and/or information on the in-vehicle payment when the in-vehicle payment is requested from a vehicle providing an in-vehicle payment function.

In one implementation, the processor may detect the fraudulent financial transaction by comparing a travel time between a location where the in-vehicle payment has occurred and a location where a previous payment has occurred with a difference between a time the in-vehicle payment has occurred and a time the previous payment has occurred. The travel time may be calculated in consideration of a time zone.

In one implementation, the processor may detect the fraudulent financial transaction by comparing a location where the in-vehicle payment has occurred with a location of an affiliated store where the in-vehicle payment has been requested.

In one implementation, the processor may detect the fraudulent financial transaction based on whether the occupant of the vehicle exists identified through an occupant detection system (ODS) of the vehicle.

In one implementation, the processor may detect the fraudulent financial transaction based on whether the communication network of the vehicle is in a sleep state.

In one implementation, the processor may detect the fraudulent financial transaction based on whether the speed of the vehicle exceeds a specific speed.

In one implementation, the processor may detect the fraudulent financial transaction based on whether the in-vehicle payment through fast identity online (FIDO) has been requested in a state where the fingerprint authentication module is not mounted in the vehicle.

In one implementation, the processor may detect the fraudulent financial transaction based on whether the in-vehicle payment has been requested in a state where the battery of the vehicle is being charged.

In one implementation, the processor may detect the fraudulent financial transaction based on whether payment has been requested through payment means not registered in the user account of the vehicle.

In one implementation, the processor may detect the fraudulent financial transaction by comparing an amount of money calculated, based on a difference between a maximum fuel storage capacity of the vehicle and a current fuel remaining amount and an oil price of a gas station, with an amount of money of the in-vehicle payment when the in-vehicle payment has occurred at the gas station.

In one implementation, the processor may detect the fraudulent financial transaction by comparing an amount of money calculated, based on a difference between a maximum charging capacity of the battery of the vehicle and a current battery remaining amount and a price for each unit charge amount of a charging station, with an amount of money of the in-vehicle payment when the in-vehicle payment has occurred at the charging station.

In one implementation, the processor may detect the fraudulent financial transaction by comparing an amount of money calculated, based on a difference between a time the payment has been requested and a time the vehicle has arrived at a parking lot and a parking fee for each unit time of the parking lot, with an amount of money of the in-vehicle payment when the in-vehicle payment has occurred at the parking lot.

In one implementation, the processor may detect the fraudulent financial transaction by comparing a service where the in-vehicle payment has occurred with a service provided by an affiliated store.

According to another aspect of the present disclosure, a method for detecting a fraudulent financial transaction includes receiving a request for an in-vehicle payment from a vehicle providing an in-vehicle payment function. The method also includes detecting the fraudulent financial transaction in the in-vehicle payment based on at least one of a vehicle location, the number of vehicle occupants, a state of a communication network, a vehicle speed, whether a fingerprint authentication module is mounted, a state of a battery, a user account, and/or information on the in-vehicle payment when the in-vehicle payment is requested.

In one implementation, the detecting of the fraudulent financial transaction may include detecting the fraudulent financial transaction by comparing a travel time between a location where the in-vehicle payment has occurred and a location where a previous payment has occurred with a difference between a time the in-vehicle payment has occurred and a time the previous payment has occurred. The travel time may be calculated in consideration of a time zone.

In one implementation, the detecting of the fraudulent financial transaction may include detecting the fraudulent financial transaction by comparing a location where the in-vehicle payment has occurred with a location of an affiliated store where the in-vehicle payment has been requested.

In one implementation, the detecting of the fraudulent financial transaction may include at least one of: detecting the fraudulent financial transaction based on whether the occupant of the vehicle exists identified through an ODS of the vehicle; detecting the fraudulent financial transaction based on whether the communication network of the vehicle is in a sleep state; detecting the fraudulent financial transaction based on whether the speed of the vehicle exceeds a specific speed; detecting the fraudulent financial transaction based on whether the in-vehicle payment through FIDO has been requested in a state where the fingerprint authentication module is not mounted in the vehicle; and/or detecting the fraudulent financial transaction based on whether the in-vehicle payment has been requested in a state where the battery of the vehicle is being charged.

In one implementation, the detecting of the fraudulent financial transaction may include detecting the fraudulent financial transaction based on whether payment has been requested through payment means not registered in the user account of the vehicle.

In one implementation, the detecting of the fraudulent financial transaction may include at least one of: detecting the fraudulent financial transaction by comparing an amount of money calculated, based on a difference between a maximum fuel storage capacity of the vehicle and a current fuel remaining amount and an oil price of a gas station, with an amount of money of the in-vehicle payment when the in-vehicle payment has occurred at the gas station; detecting the fraudulent financial transaction by comparing an amount of money calculated, based on a difference between a maximum charging capacity of the battery of the vehicle and a current battery remaining amount and a price for each unit charge amount of a charging station, with an amount of money of the in-vehicle payment when the in-vehicle payment has occurred at the charging station; and/or detecting the fraudulent financial transaction by comparing an amount of money calculated, based on a difference between a time the payment has been requested and a time the vehicle has arrived at a parking lot and a parking fee for each unit time of the parking lot, with an amount of money of the in-vehicle payment when the in-vehicle payment has occurred at the parking lot.

In one implementation, the detecting of the fraudulent financial transaction may include detecting the fraudulent financial transaction by comparing a service where the in-vehicle payment service has occurred with a service provided by an affiliated store.

BRIEF DESCRIPTION OF THE DRAWINGS

The above and other objects, features, and advantages of the present disclosure should be more apparent from the following detailed description taken in conjunction with the accompanying drawings:

FIG. 3 is a diagram illustrating a fraudulent financial transaction detection rule according to an embodiment of the present disclosure.

DETAILED DESCRIPTION

Figure 1:
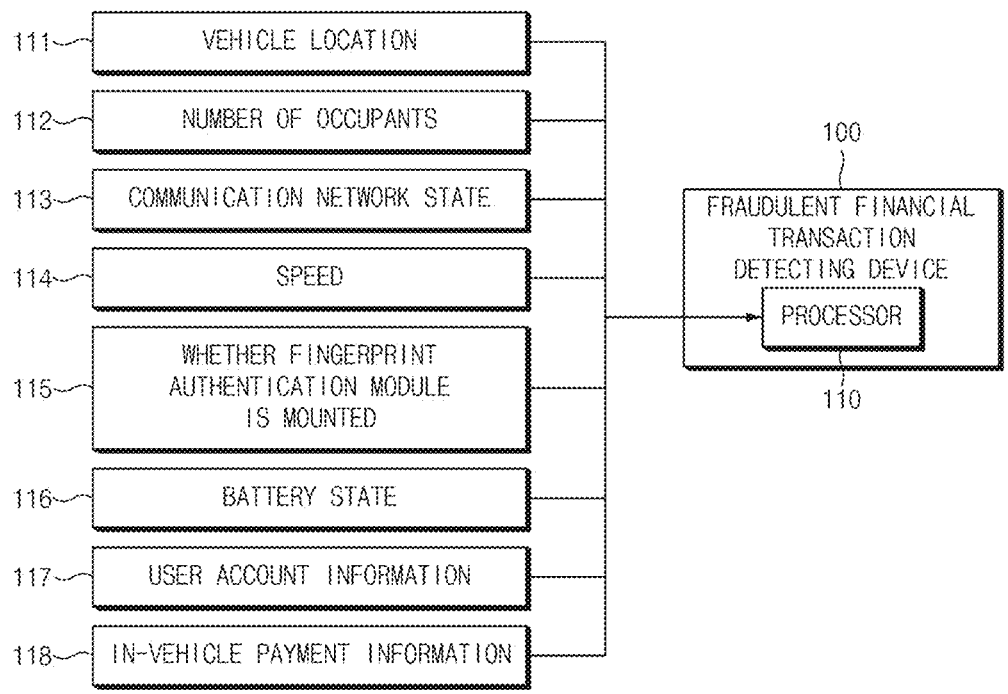
FIG. 1 is a block diagram illustrating a device for detecting a fraudulent financial transaction according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configurations or functions have been omitted when it is determined that it would interfere with understanding the embodiments of the present disclosure.

In describing the components of the embodiments according to the present disclosure, terms such as first, second, A, B, (a), (b), and the like may be used. These terms are merely intended to distinguish the components from other components and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-4.

FIG. 1 is a block diagram illustrating a device for detecting a fraudulent financial transaction according to an embodiment of the present disclosure.

A fraudulent financial transaction detecting device 100 may be implemented by including a processor 110.

As an example, the fraudulent financial transaction detecting device 100 may be equipped in a vehicle or may be equipped outside the vehicle without being equipped in the vehicle.

As an example, the fraudulent financial transaction detecting device 100 may be implemented in a form of a server outside the vehicle or may be implemented by being included in a configuration of an in-vehicle payment system.

The processor 110 may receive data and perform data processing, calculation, or the like in various forms, which is described below.

The processor 110 may be connected to a component of the vehicle or a component of the in-vehicle payment system in a wireless or wired manner to directly or indirectly receive the data.

As shown in FIG. 1, the processor 110 may receive at least one data of a vehicle location 111, the number of occupants 112, a communication network state 113, a vehicle speed 114, whether a fingerprint authentication module is mounted 115, a battery state 116, user account information 117, and/or in-vehicle payment information 118.

The processor 110 may acquire the data on the location of the vehicle 111 through the vehicle.

As an example, the vehicle may acquire the vehicle location 111 through a global positioning system (GPS) or an audio, video, navigation (AVN) and may directly or indirectly transmit the data on the vehicle's location 111 to the processor 110 through a communication module of the vehicle.

The processor 110 may acquire the data on the number of occupants 112 of the vehicle through the vehicle.

For example, the vehicle may identify the number of occupants 112 of the vehicle through an occupant detection system (ODS) and directly or indirectly transmit the data on the number of occupants 112 of the vehicle to the processor 110 through the communication module of the vehicle.

The processor 110 may acquire the data on the communication network state 113 of the vehicle through the vehicle.

For example, a communication network of the vehicle may include CAN communication of the vehicle. The vehicle may determine whether the communication network state 113 is a sleep state and may directly or indirectly transmit the data on whether the state 113 of the communication network is the sleep state to the processor 110 through the communication module of the vehicle.

The processor 110 may acquire the data on the speed 114 of the vehicle through the vehicle.

As an example, the vehicle may acquire the speed 114 of the vehicle through a vehicle speed sensor and may directly or indirectly transmit the data on the speed 114 of the vehicle to the processor 110 through the communication module of the vehicle.

The processor 110 may acquire the data on whether the fingerprint authentication module is mounted 115 through the vehicle.

As an example, the vehicle may store information on whether the fingerprint authentication module is mounted in the vehicle 115 in a memory in a processor being produced. In addition, the vehicle may store the information on whether the fingerprint authentication module is mounted 115 in the memory when the fingerprint authentication module is not equipped in the processor being produced but the fingerprint authentication module is additionally mounted afterwards.

In this case, the vehicle may acquire the data on whether the fingerprint authentication module is mounted 115 through the memory of the vehicle and may directly or indirectly transmit the data on whether the fingerprint authentication module is mounted 115 to the processor 110 through the communication module of the vehicle.

The processor 110 may acquire the data on the battery state 116 through the vehicle.

As an example, the vehicle may identify the battery state 116 of the vehicle through a battery sensor and may directly or indirectly transmit the battery state 116 of the vehicle to the processor 110 through the communication module of the vehicle.

The processor 110 may acquire the user account information 117 through the vehicle or the in-vehicle payment system.

As an example, the user account information 117 may include information on payment means registered by a user for in-vehicle payment.

As an example, the user account information 117 may include information on a card registered by the user for the in-vehicle payment.

The vehicle or the in-vehicle payment system may transmit the user account information 117 to the processor 110 through the communication module.

The processor 110 may acquire the in-vehicle payment information 118 through the vehicle or the in-vehicle payment system.

For example, the in-vehicle payment information 118 may include at least one of an amount of money of the in-vehicle payment, an in-vehicle payment location, an affiliated store where the in-vehicle payment was made, a product/service paid through the in-vehicle payment, the payment means of the in-vehicle payment, and/or whether the in-vehicle payment was made through a fast identity online (FIDO) fingerprint authentication payment.

As an example, when the affiliated store where the in-vehicle payment is made is a gas station, the in-vehicle payment information 118 may include information on an oil price of the corresponding gas station at a time point at which the in-vehicle payment has occurred.

As an example, when the affiliated store where the in-vehicle payment is made is a charging station, the in-vehicle payment information 118 may include information on a price for each unit charge amount of the corresponding charging station at the time point at which the in-vehicle payment has occurred.

The vehicle or the in-vehicle payment system may transmit the in-vehicle payment information 118 to the processor 110 through the communication module.

Figure 2:
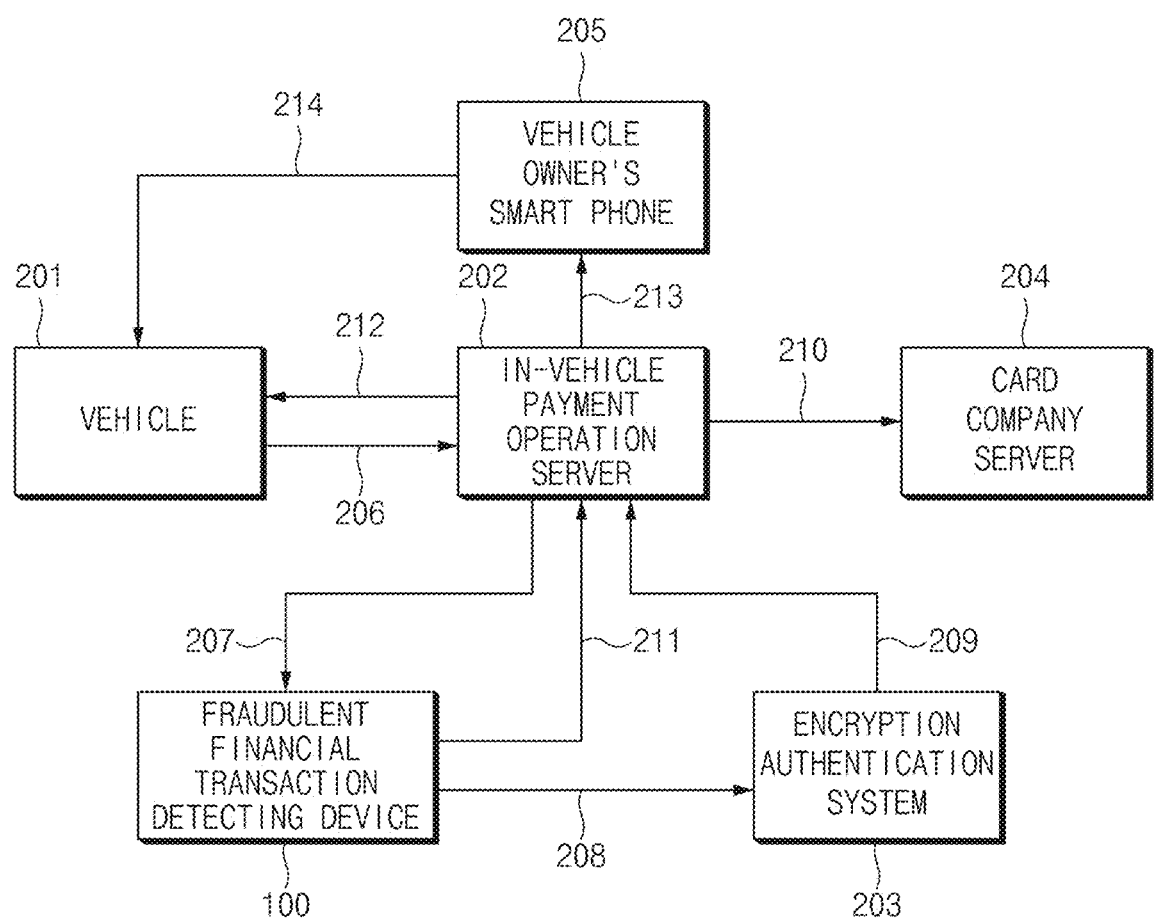
FIG. 2 is a diagram illustrating an in-vehicle payment system including a device for detecting a fraudulent financial transaction according to an embodiment of the present disclosure.

FIG. 2 is a diagram illustrating an in-vehicle payment system including a device for detecting a fraudulent financial transaction according to an embodiment of the present disclosure.

Referring to FIG. 2, the in-vehicle payment system may include the fraudulent financial transaction detecting device 100, a vehicle 201, an in-vehicle payment operation server 202, an encryption authentication system 203, a card company server 204, and a vehicle owner's smart phone 205.

First, components included in the in-vehicle payment system are described below.

The vehicle 201 may include a vehicle that provides an in-vehicle payment function. The vehicle 201 may be implemented by including a communication module capable of communicating with the vehicle owner's smart phone 205 and the in-vehicle payment operation server 202.

The in-vehicle payment operation server 202 may include an Original Equipment Manufacturer (OEM) server that manages information on the in-vehicle payment.

For example, the in-vehicle payment operation server 202 may process data on approval of the in-vehicle payment and an approval result of the in-vehicle payment.

The in-vehicle payment operation server 202 may be implemented by including a communication module capable of communicating with the fraudulent financial transaction detecting device 100, the vehicle 201, the encryption authentication system 203, the card company server 204, and the vehicle owner's smart phone 205.

The encryption authentication system 203 may include a system that performs authentication through encryption for the information on the in-vehicle payment.

The encryption authentication system 203 may be implemented including a communication module capable of communicating with the fraudulent financial transaction detecting device 100 and the in-vehicle payment operation server.

The card company server 204 may include a server of a card company corresponding to the card, which is the payment means of the in-vehicle payment.

The card company server 204 may be implemented including a communication module capable of communicating with the in-vehicle payment operation server 202.

The vehicle owner's smart phone 205 may include a smart phone in association with an account registered in the in-vehicle payment system.

The vehicle owner's smart phone 205 may be implemented by including a communication module capable of communicating with the vehicle 201 and the in-vehicle payment operation server 202.

Hereinafter, a process in which the in-vehicle payment is performed through communication between components included in the in-vehicle payment system is described by being divided into a case where normal in-vehicle payment is performed and a case where a fraudulent financial transaction is detected.

The process in which the normal in-vehicle payment is performed may include: a process (206) of requesting the approval of the in-vehicle payment; a process (207) of verifying whether the fraudulent financial transaction in the in-vehicle payment exists; a process (208) of requesting encryption authentication for the in-vehicle payment; a process (209) of requesting the in-vehicle payment to the in-vehicle payment server after the encryption authentication is performed; and a process (210) of requesting the in-vehicle payment to the card company server.

The vehicle 201 may request the approval of the in-vehicle payment to the in-vehicle payment operation server 202 (206). In this case, the vehicle 201 may transmit the approval request information of the in-vehicle payment to the in-vehicle payment operation server 202 through the communication module.

Thereafter, the in-vehicle payment operation server 202 may request the fraudulent financial transaction detecting device 100 to detect the fraudulent financial transaction in the in-vehicle payment (207). In this case, the in-vehicle payment operation server 202 may transmit the information on the in-vehicle payment and information necessary to detect the fraudulent financial transaction in the in-vehicle payment to the fraudulent financial transaction detecting device 100 through the communication module.

Thereafter, the fraudulent financial transaction detecting device 100 may determine that the fraudulent financial transaction has not occurred in the in-vehicle payment and may request the encryption authentication for the in-vehicle payment to the encryption authentication system 203 (208). In this case, the fraudulent financial transaction detecting device 100 may transmit a fraudulent financial transaction detection result and the information on the in-vehicle payment to the encryption authentication system 203 through the communication module.

Thereafter, the encryption authentication system 203 may perform the authentication through the encryption for the in-vehicle payment and may request the in-vehicle payment to the in-vehicle payment operation server 202 when there is no abnormality (209). In this case, the encryption authentication system 203 may transmit a result of the encryption authentication for the in-vehicle payment to the in-vehicle payment operation server 202 through the communication module.

Thereafter, the in-vehicle payment operation server 202 may request the in-vehicle payment to the card company server 204 (210). In this case, the in-vehicle payment operation server 202 may transmit the information on the in-vehicle payment and information on the request of the in-vehicle payment to the card company server 204 through the communication module.

When the fraudulent financial transaction is detected in the in-vehicle payment, the in-vehicle payment process may include: the process (206) of requesting the approval of the in-vehicle payment; the process (207) of verifying whether the fraudulent financial transaction in the in-vehicle payment exists; a process (211) of outputting a result indicating that the fraudulent financial transaction has occurred in the in-vehicle payment; a process (212) of outputting a result indicating that the in-vehicle payment has failed and stopping the in-vehicle payment function of the corresponding vehicle; a process (213) of notifying a vehicle owner that the fraudulent financial transaction in the in-vehicle payment has occurred; and a process (214) of providing a function capable of activating the in-vehicle payment function of the corresponding vehicle only in an application of the vehicle owner's smart phone.

The vehicle 201 may request the approval of the in-vehicle payment to the in-vehicle payment operation server 202 (206). In this case, the vehicle 201 may transmit the approval request information of the in-vehicle payment to the in-vehicle payment operation server 202 through the communication module.

Thereafter, the in-vehicle payment operation server 202 may request the fraudulent financial transaction detecting device 100 to detect the fraudulent financial transaction in the in-vehicle payment (207). In this case, the in-vehicle payment operation server 202 may transmit the information on the in-vehicle payment and the information necessary to detect the fraudulent financial transaction in the in-vehicle payment to the fraudulent financial transaction detecting device 100 through the communication module.

Thereafter, the fraudulent financial transaction detecting device 100 may determine that fraudulent financial transaction has occurred in the in-vehicle payment and may output the result indicating that the fraudulent financial transaction has occurred in the in-vehicle payment and transmit the result to the in-vehicle payment operation server 202 (211). In this case, the fraudulent financial transaction detecting device 100 may output the result indicating that the fraudulent financial transaction has occurred in the in-vehicle payment and transmit the result to the in-vehicle payment operation server 202 through the communication module.

The in-vehicle payment operation server 202 may output the result indicating that the in-vehicle payment has failed and transmit the result to the vehicle 201 and may transmit a command for stopping the in-vehicle payment function of the corresponding vehicle (212). In this case, the in-vehicle payment operation server 202 may output the result indicating that the in-vehicle payment has failed and transmit the result to the vehicle 201 through the communication module and may transmit the command for stopping the in-vehicle payment function of the corresponding vehicle. The vehicle 201 may notify the user that the in-vehicle payment has failed and that the in-vehicle payment function is stopped through a display or the like of the vehicle.

The in-vehicle payment operation server 202 may notify the user that the fraudulent financial transaction in the in-vehicle payment has occurred through the vehicle owner's smart phone 205 (213). In this case, the in-vehicle payment operation server 202 may transmit information indicating that the fraudulent financial transaction in the in-vehicle payment has occurred to the vehicle owner's smart phone 205 through the communication module.

The vehicle owner may reactivate the in-vehicle payment function of the vehicle 201 of which the in-vehicle payment function is stopped through the application of the vehicle owner's smart phone 205 (214). When a command for activating the in-vehicle payment function is input in the application of the vehicle owner's smart phone 205, the vehicle owner's smart phone 205 may transmit the command for activating the in-vehicle payment function to the vehicle 201 through the communication module.

FIG. 3 is a diagram illustrating a fraudulent financial transaction detection rule according to an embodiment of the present disclosure.

The fraudulent financial transaction detecting device 100 may detect the fraudulent financial transaction in the in-vehicle payment based on a fraudulent financial transaction detection rule shown in FIG. 3.

As an example, when the fraudulent financial transaction is detected based on at least one of vehicle location information, vehicle state information, the user account information, and/or payment information of the in-vehicle payment, the fraudulent financial transaction detecting device 100 may classify the case where the fraudulent financial transaction is detected into a case where the fraudulent financial transaction is detected based on the user account information and a case where the fraudulent financial transaction is detected based on the payment information.

The fraudulent financial transaction detecting device 100 may detect the fraudulent financial transaction by comparing a travel time between a location at which the in-vehicle payment has occurred and a location at which a previous payment has occurred, which is calculated in consideration of a time zone, with a difference between a time at which the in-vehicle payment has occurred and a time at which the previous payment has occurred.

As an example, the fraudulent financial transaction detecting device 100 may calculate the shortest time required to travel between the location at which the in-vehicle payment has occurred and the location at which the previous payment has occurred in consideration of the time zone. The fraudulent financial transaction detecting device 100 may also determine that the fraudulent financial transaction in the in-vehicle payment has occurred when the calculated shortest time required is greater than the difference between the time at which the current in-vehicle payment has occurred and the time at which the previous payment has occurred.

In this case, because an interval between the times at which the in-vehicle payments have occurred is excessively small, it is not able to travel to a point at which the in-vehicle payment has occurred. Thus, the fraudulent financial transaction detecting device 100 may determine that the fraudulent financial transaction has occurred in the in-vehicle payment.

The fraudulent financial transaction detecting device 100 may detect the fraudulent financial transaction by comparing the location at which the in-vehicle payment has occurred with a location of the affiliated store where the in-vehicle payment has been requested.

As an example, when a GPS location value of the vehicle at the time point at which the in-vehicle payment has occurred and a GPS location value of the affiliated store where the payment request has occurred are different from each other even when a location error of a specific value is corrected, the fraudulent financial transaction detecting device 100 may determine that the fraudulent financial transaction in the in-vehicle payment has occurred.

The fraudulent financial transaction detecting device 100 may detect the fraudulent financial transaction based on whether the occupant of the vehicle exists identified through the ODS of the vehicle.

As an example, the fraudulent financial transaction detecting device 100 may determine that the fraudulent financial transaction has occurred when the number of occupants of the vehicle is identified through the ODS of the vehicle to be 0.

The fraudulent financial transaction detecting device 100 may detect the fraudulent financial transaction based on whether the communication network of the vehicle is in the sleep state.

As an example, when the in-vehicle payment has been requested in a state in which the CAN communication of the vehicle is in the sleep state, the fraudulent financial transaction detecting device 100 may determine that the fraudulent financial transaction in the in-vehicle payment has occurred.

The fraudulent financial transaction detecting device 100 may detect the fraudulent financial transaction based on whether the speed of the vehicle exceeds a specific speed.

As an example, when the in-vehicle payment has been requested in a state in which the speed of the vehicle is equal to or higher than 10 km/h, the fraudulent financial transaction detecting device 100 may determine that the fraudulent financial transaction in the in-vehicle payment has occurred.

In this connection, the value of 10 km/h is a value arbitrarily determined for illustrative purposes. Thus, the present disclosure may not be limited thereto and the specific speed may be determined as another value.

The fraudulent financial transaction detecting device 100 may detect the fraudulent financial transaction based on whether the in-vehicle payment through the FIDO has been requested in a state in which the fingerprint authentication module is not mounted in the vehicle.

As an example, when the in-vehicle payment through the FIDO has been requested in the state in which the fingerprint authentication module is not mounted in the vehicle, the fraudulent financial transaction detecting device 100 may determine that the fraudulent financial transaction in the in-vehicle payment has occurred.

The fraudulent financial transaction detecting device 100 may detect the fraudulent financial transaction based on whether the in-vehicle payment has been requested in a state in which a vehicle battery is being charged.

As an example, when the in-vehicle payment has been requested in the state in which the battery is being charged, the fraudulent financial transaction detecting device 100 may determine that the fraudulent financial transaction in the in-vehicle payment has occurred.

The fraudulent financial transaction detecting device 100 may detect the fraudulent financial transaction based on whether the payment has been requested through payment means not registered in a user account of the vehicle.

As an example, when the payment has been requested through another payment means other than a payment card registered in user information of the vehicle, the fraudulent financial transaction detecting device 100 may determine that the fraudulent financial transaction in the in-vehicle payment has occurred.

When a price of a product/service of the affiliated store is different from the amount of money of the in-vehicle payment, the fraudulent financial transaction detecting device 100 may determine that the fraudulent financial transaction in the in-vehicle payment has occurred.

When the in-vehicle payment has occurred at the gas station, the fraudulent financial transaction detecting device 100 may detect the fraudulent financial transaction by comparing an amount of money calculated based on a difference between a maximum fuel storage capacity of the vehicle and a current fuel remaining amount and the oil price of the gas station with the amount of money of the in-vehicle payment.

As an example, when the in-vehicle payment has occurred at the gas station and when the amount of money of the in-vehicle payment is larger than a product of a price for each oil type of the corresponding gas station at the time point at which the in-vehicle payment has occurred and the difference between the maximum fuel storage capacity of the vehicle where the in-vehicle payment has occurred and the current fuel remaining amount, the fraudulent financial transaction detecting device 100 may determine that the fraudulent financial transaction in the in-vehicle payment has occurred.

When the in-vehicle payment has occurred at the charging station, the fraudulent financial transaction detecting device 100 may detect the fraudulent financial transaction by comparing an amount of money calculated, based on a difference between a maximum charging capacity of the battery of the vehicle and a current battery remaining amount and the price for each unit charge amount of the charging station, with the amount of money of the in-vehicle payment.

As an example, when the in-vehicle payment has occurred at the charging station and when the amount of money of the in-vehicle payment is larger than a product of the price for each unit charge amount of the corresponding charging station at the time point at which the in-vehicle payment has occurred and the difference between the maximum charging capacity of the vehicle where the in-vehicle payment has occurred and the current battery remaining amount, the fraudulent financial transaction detecting device 100 may determine that the fraudulent financial transaction in the in-vehicle payment has occurred.

When the in-vehicle payment has occurred in a parking lot, the fraudulent financial transaction detecting device 100 may detect the fraudulent financial transaction by comparing an amount of money calculated, based on a difference between a time at which the payment has been requested and a time at which the vehicle has arrived at the parking lot and a parking fee for each unit time of the parking lot, with the amount of money of the in-vehicle payment.

As an example, when the in-vehicle payment has occurred in the parking lot and when the amount of money of the in-vehicle payment is larger than a product of the parking fee for each unit time of the parking lot where the in-vehicle payment has occurred and the difference between the time at which the payment has been requested and the time at which the vehicle has arrived at the parking lot, the fraudulent financial transaction detecting device 100 may determine that the fraudulent financial transaction in the in-vehicle payment has occurred.

The fraudulent financial transaction detecting device 100 may detect the fraudulent financial transactions by comparing a service through which the in-vehicle payment has occurred with a service provided by the affiliated store.

As an example, when a type of the product/service of the affiliated store and order information of the in-vehicle payment are different from each other, the fraudulent financial transaction detecting device 100 may determine that the fraudulent financial transaction in the in-vehicle payment has occurred.

As an example, when the in-vehicle payment has occurred at the gas station or the charging station and when all of a vehicle fuel type (gasoline, diesel, liquefied petroleum gas (LPG), hydrogen, an electric vehicle, a plug-in hybrid electric vehicle (PHEV)), a type of the product/service provided by the affiliated store where the in-vehicle payment has occurred, and the order information of the in-vehicle payment do not match, the fraudulent financial transaction detecting device 100 may determine that the fraudulent financial transaction in the in-vehicle payment has occurred.

Figure 4:
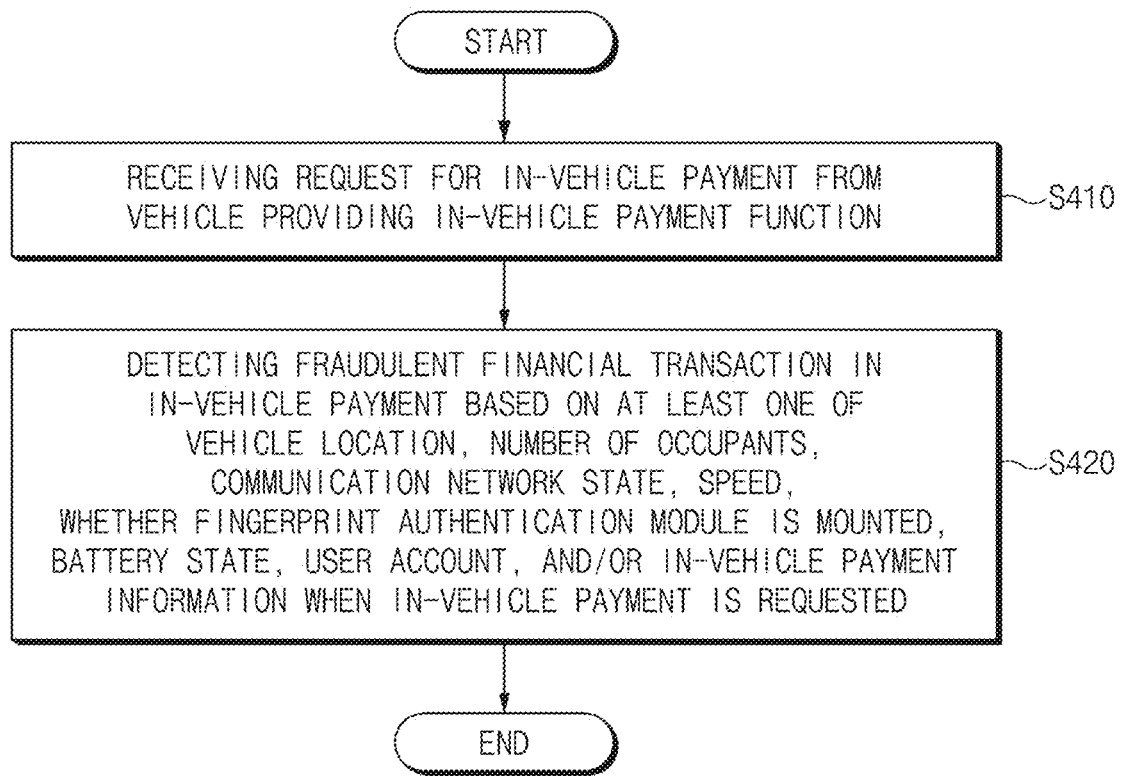
FIG. 4 is a diagram illustrating a method for detecting a fraudulent financial transaction according to an embodiment of the present disclosure.

FIG. 4 is a diagram illustrating a method for detecting a fraudulent financial transaction according to an embodiment of the present disclosure.

Referring to FIG. 4, a method for detecting a fraudulent financial transaction may include receiving the request for the in-vehicle payment from the vehicle providing the in-vehicle payment function (S410). The method may also include detecting the fraudulent financial transaction in the in-vehicle payment based on at least one of the vehicle location, the number of vehicle occupants, the communication network state, the vehicle speed, whether the fingerprint authentication module is mounted, the battery state, the user account, and/or the in-vehicle payment information when the in-vehicle payment is requested (S420).

As an example, the receiving of the request for the in-vehicle payment from the vehicle providing the in-vehicle payment function (S410) may be performed through the in-vehicle payment system and the fraudulent financial transaction detecting device 100.

As an example, the in-vehicle payment system may include a user interface (UI) and receive the request for the in-vehicle payment from the user through the UI. In addition, the in-vehicle payment system may be implemented by including the communication module that provides the communication function for the fraudulent financial transaction detecting device 100.

As an example, the in-vehicle payment system may transmit the information on the request of the in-vehicle payment to the fraudulent financial transaction detecting device 100.

As an example, the detecting of the fraudulent financial transaction in the in-vehicle payment (S420) may include detecting the fraudulent financial transaction by comparing the travel time between the location at which the in-vehicle payment has occurred and the location at which the previous payment has occurred, which is calculated in consideration of the time zone, with the difference between the time at which the in-vehicle payment has occurred and the time at which the previous payment has occurred.

As an example, the detecting of the fraudulent financial transaction in the in-vehicle payment (S420) may include detecting the fraudulent financial transaction by comparing the location at which the in-vehicle payment has occurred with the location of the affiliated store where the in-vehicle payment has been requested.

As an example, the detecting of the fraudulent financial transaction in the in-vehicle payment (S420) may include detecting the fraudulent financial transaction based on whether the occupant of the vehicle exists identified through the ODS of the vehicle.

As an example, the detecting of the fraudulent financial transaction in the in-vehicle payment (S420) may include detecting the fraudulent financial transactions based on whether the communication network of the vehicle is in the sleep state.

As an example, the detecting of the fraudulent financial transaction in the in-vehicle payment (S420) may include detecting the fraudulent financial transaction based on whether the speed of the vehicle exceeds the specific speed.

As an example, the detecting of the fraudulent financial transaction in the in-vehicle payment (S420) may include detecting the fraudulent financial transaction based on whether the in-vehicle payment through the FIDO has been requested in the state in which the fingerprint authentication module is not mounted in the vehicle.

As an example, the detecting of the fraudulent financial transaction in the in-vehicle payment (S420) may include detecting the fraudulent financial transaction based on whether the in-vehicle payment has been requested in the state in which the battery of the vehicle is being charged.

As an example, the detecting of the fraudulent financial transaction in the in-vehicle payment (S420) may include detecting the fraudulent financial transaction based on whether the payment has been requested through the payment means not registered in the user account of the vehicle.

As an example, the detecting of the fraudulent financial transaction in the in-vehicle payment (S420) may include detecting the fraudulent financial transaction by comparing the amount of money calculated, based on the difference between the maximum fuel storage capacity of the vehicle and the current fuel remaining amount and the oil price of the gas station, with the amount of money of the in-vehicle payment when the in-vehicle payment has occurred at the gas station.

As an example, the detecting of the fraudulent financial transaction in the in-vehicle payment (S420) may include detecting the fraudulent financial transaction by comparing the amount of money calculated, based on the difference between the maximum charging capacity of the battery of the vehicle and the current battery remaining amount and the price for each unit charge amount of the charging station, with the amount of money of the in-vehicle payment when the in-vehicle payment has occurred at the charging station.

As an example, the detecting of the fraudulent financial transaction in the in-vehicle payment (S420) may include detecting the fraudulent financial transaction by comparing the amount of money calculated, based on the difference between the time at which the payment has been requested and the time at which the vehicle has arrived at the parking lot and the parking fee for each unit time of the parking lot, with the amount of money of the in-vehicle payment when the in-vehicle payment has occurred at the parking lot.

As an example, the detecting of the fraudulent financial transaction in the in-vehicle payment (S420) may include detecting the fraudulent financial transaction by comparing the service through which the in-vehicle payment has occurred with the service provided by the affiliated store.

The description above is merely illustrative of the technical idea of the present disclosure. Various modifications and changes may be made by those having ordinary skill in the art without departing from the essential characteristics of the present disclosure.

Therefore, the embodiments disclosed in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims. All technical ideas falling within the scope of the claims should be construed as being included in the scope of the present disclosure.

Effects of the device and the method for detecting the fraudulent financial transaction according to the present disclosure are described as follows.

According to at least one of the embodiments of the present disclosure, the device and the method for detecting the fraudulent financial transaction in the in-vehicle payment may reduce the cost in the process of detecting the fraudulent financial transaction by simply detecting the fraudulent financial transaction based on the usage scenario may be provided.

In addition, according to at least one of the embodiments of the present disclosure, the device and the method for detecting the fraudulent financial transaction in the in-vehicle payment may prevent the financial crime against the in-vehicle payment by easily detecting the fraudulent financial transaction in the in-vehicle payment may be provided.

In addition, according to at least one of the embodiments of the present disclosure, the device and the method for detecting the fraudulent financial transaction in the in-vehicle payment may strengthen the security by detecting the fraudulent financial transaction in the in-vehicle payment to stop the payment function of the corresponding vehicle and by allowing the payment function of the vehicle to be reactivated through the application of the vehicle owner's smart phone may be provided.

In addition, various effects that are directly or indirectly identified through this document may be provided.

Hereinabove, although the present disclosure has been described with reference to embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

What is claimed is:

1. A device for detecting a fraudulent financial transaction occurred in a vehicle configured to provide an in-vehicle payment function, the device comprising:

a processor configured to detect the fraudulent financial transaction in an in-vehicle payment provided by the vehicle based on at least one of a real time GPS vehicle location value, the number of vehicle occupants, a state of a communication network, a real time vehicle speed while the vehicle is traveling, whether a fingerprint authentication module is mounted, a state of a battery, a user account, and/or information on the in-vehicle payment when the in-vehicle payment is requested from the vehicle configured to provide the in-vehicle payment function, wherein the processor is further configured to calculate a shortest time required to travel between a location at which the in-vehicle payment has occurred and a location at which a previous payment has occurred in consideration of a time zone, acquire, from a GPS device, real-time GPS location values of the vehicle while the vehicle is traveling, acquire, from a vehicle speed sensor, real-time vehicle speeds while the vehicle is traveling, determine that the fraudulent financial transaction has occurred, when the calculated shortest time required is greater than a difference between a time at which a current in-vehicle payment has occurred and a time at which the previous payment has occurred, determine in real time that the fraudulent financial transaction has occurred, when a real-time GPS location value of the vehicle while the vehicle is traveling at a time point at which the in-vehicle payment has occurred and a GPS location value of an affiliated store where a payment request has occurred are different from each other even when a location error of a specific value is corrected, determine that the fraudulent financial transaction has occurred, when a number of occupants of the vehicle is identified through an occupant detection system (ODS) of the vehicle to be 0, determine that the fraudulent financial transaction has occurred, based on whether the communication network of the vehicle is in a sleep state, determine in real time that the fraudulent financial transaction has occurred while the vehicle is traveling, based on whether a real-time vehicle speed while the vehicle is traveling and when the in-vehicle payment is requested by the vehicle is equal to or higher than a predetermined speed, determine that the fraudulent financial transaction has occurred, based on whether the in-vehicle payment through fast identity online (FIDO) has been requested in a state where the fingerprint authentication module is not mounted in the vehicle, determine that the fraudulent financial transaction has occurred, based on whether the in-vehicle payment has been requested in a state where the battery of the vehicle is being charged, and send a signal in real time to instruct an in-vehicle payment operation server to stop the in-vehicle payment function provided by the vehicle in response to the determination that the fraudulent financial transaction has occurred.

2. The device of claim 1, wherein the processor is configured to detect the fraudulent financial transaction based on whether payment has been requested through payment means not registered in the user account of the vehicle.

3. The device of claim 1, wherein the processor is configured to detect the fraudulent financial transaction by comparing an amount of money calculated, based on a difference between a maximum fuel storage capacity of the vehicle and a current fuel remaining amount and an oil price of a gas station, with an amount of money of the in-vehicle payment when the in-vehicle payment has occurred at the gas station.

4. The device of claim 1, wherein the processor is configured to detect the fraudulent financial transaction by comparing an amount of money calculated, based on a difference between a maximum charging capacity of the battery of the vehicle and a current battery remaining amount and a price for each unit charge amount of a charging station, with an amount of money of the in-vehicle payment when the in-vehicle payment has occurred at the charging station.

5. The device of claim 1, wherein the processor is configured to detect the fraudulent financial transaction by comparing an amount of money calculated, based on a difference between a time the payment has been requested and a time the vehicle has arrived at a parking lot and a parking fee for each unit time of the parking lot, with an amount of money of the in-vehicle payment when the in-vehicle payment has occurred at the parking lot.

6. The device of claim 1, wherein the processor is configured to detect the fraudulent financial transaction by comparing a service where the in-vehicle payment has occurred with a service provided by an affiliated store.

7. A method for detecting a fraudulent financial transaction occurred in a vehicle configured to provide an in-vehicle payment function, the method comprising:

receiving a request for an in-vehicle payment from the vehicle configured to provide the in-vehicle payment function; and detecting the fraudulent financial transaction in the in-vehicle payment provided by the vehicle based on at least one of a real time GPS vehicle location value, the number of vehicle occupants, a state of a communication network, a real time vehicle speed while the vehicle is traveling, whether a fingerprint authentication module is mounted, a state of a battery, a user account, and/or information on the in-vehicle payment when the in-vehicle payment is requested, wherein detecting the fraudulent financial transaction includes calculating a shortest time required to travel between a location at which the in-vehicle payment has occurred and a location at which a previous payment has occurred in consideration of a time zone, acquiring, from a GPS device, real-time GPS location values of the vehicle while the vehicle is traveling, acquiring, from a vehicle speed sensor, real-time vehicle speeds while the vehicle is traveling, determining that the fraudulent financial transaction has occurred, when the calculated shortest time required is greater than a difference between a time at which a current in-vehicle payment has occurred and a time at which the previous payment has occurred, determining in real time that the fraudulent financial transaction has occurred, when a real-time GPS location value of the vehicle while the vehicle is traveling at a time point at which the in-vehicle payment has occurred and a GPS location value of an affiliated store where a payment request has occurred are different from each other even when a location error of a specific value is corrected, determining that the fraudulent financial transaction has occurred, when a number of occupants of the vehicle is identified through an occupant detection system (ODS) of the vehicle to be 0, determining that the fraudulent financial transaction has occurred, based on whether the communication network of the vehicle is in a sleep state, determining in real-time that the fraudulent financial transaction has occurred while the vehicle is traveling, based on whether a real-time vehicle speed while the vehicle is traveling and when the in-vehicle payment is requested by the vehicle is equal to or higher than a predetermined speed, determining that the fraudulent financial transaction has occurred, based on whether the in-vehicle payment through fast identity online (FIDO) has been requested in a state where the fingerprint authentication module is not mounted in the vehicle, determining that the fraudulent financial transaction has occurred, based on whether the in-vehicle payment has been requested in a state where the battery of the vehicle is being charged, and sending a signal in real time to instruct an in-vehicle payment operation server to stop the in-vehicle payment function provided by the vehicle in response to the determination that the fraudulent financial transaction has occurred.

8. The method of claim 7, wherein the detecting of the fraudulent financial transaction includes:

detecting the fraudulent financial transaction based on whether payment has been requested through payment means not registered in the user account of the vehicle.

9. The method of claim 7, wherein the detecting of the fraudulent financial transaction includes at least one of:

detecting the fraudulent financial transaction by comparing an amount of money calculated, based on a difference between a maximum fuel storage capacity of the vehicle and a current fuel remaining amount and an oil price of a gas station, with an amount of money of the in-vehicle payment when the in-vehicle payment has occurred at the gas station;

detecting the fraudulent financial transaction by comparing an amount of money calculated, based on a difference between a maximum charging capacity of the battery of the vehicle and a current battery remaining amount and a price for each unit charge amount of a charging station, with an amount of money of the in-vehicle payment when the in-vehicle payment has occurred at the charging station; and/or detecting the fraudulent financial transaction by comparing an amount of money calculated, based on a difference between a time the payment has been requested and a time the vehicle has arrived at a parking lot and a parking fee for each unit time of the parking lot, with an amount of money of the in-vehicle payment when the in-vehicle payment has occurred at the parking lot.

10. The method of claim 7, wherein the detecting of the fraudulent financial transaction includes:

detecting the fraudulent financial transaction by comparing a service where the in-vehicle payment has occurred with a service provided by an affiliated store.

* * * * *